April 8, 1924.

J. E. STROMBERG

PHOTOGRAPHIC TRANSFER APPARATUS

Filed Feb. 4, 1919    2 Sheets-Sheet 1

1,489,510

Inventor
Jean E. Stromberg
by A. B. Bowman
Attorney.

April 8, 1924.

J. E. STROMBERG 1,489,510

PHOTOGRAPHIC TRANSFER APPARATUS

Filed Feb. 4, 1919   2 Sheets-Sheet 2

Inventor
Jean E. Stromberg
by A.B. Bowman
Attorney.

Patented Apr. 8, 1924.

1,489,510

UNITED STATES PATENT OFFICE.

JEAN E. STROMBERG, OF SAN DIEGO, CALIFORNIA.

PHOTOGRAPHIC TRANSFER APPARATUS.

Application filed February 4, 1919. Serial No. 274,887.

*To all whom it may concern:*

Be it known that I, JEAN E. STROMBERG, a citizen of the United States, residing at San Diego, in the county of San Diego and State of California, have invented certain new and useful Improvements in Photographic Transfer Apparatus, of which the following is a specification.

My invention relates to an apparatus for enlarging or reducing photographic negatives, positives, prints, transfers, plates, films and the like more particularly adapted for a long continuous film negative and the objects of my invention are first, to provide an apparatus whereby enlargements or reductions may be made from long continuous film negatives or ordinary negatives or positives, from prints, plates or other transferences which are too large or long to be projected by the usual photographic process, second, to provide such an apparatus whereby the film is supported on an arc of a circle on a radius from a point approximately half way between the nodal points of the objective, in which the distance of said arc from said point may be increased or reduced to make the same proportional to the focal length of the objective to provide for adjustment of the enlarging apparatus necessitated by the use of slightly different sizes, shapes or grades of lenses or systems of lenses to properly focus the enlarging apparatus dependent upon the objective, after which it remains fixed, third, to provide means for automatically moving the film negative over the support relatively with the revolution of the light projecting apparatus upon its pivotal mounting, fourth, to provide an apparatus of this class in which continuous panoramic figures may be transferred on an enlarged or reduced scale and fifth, to provide an apparatus of this class which is simple and economical of construction, automatic in its action, durable, adjustable, accurate and in which the reproductions will be clear, perfect and properly focused.

Figure 1:
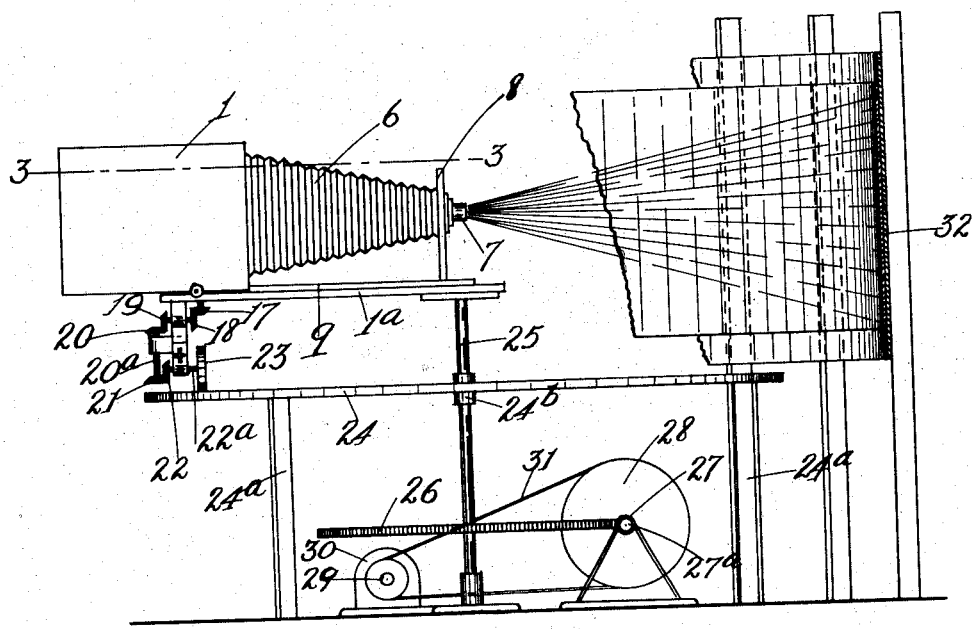
Figure 2:
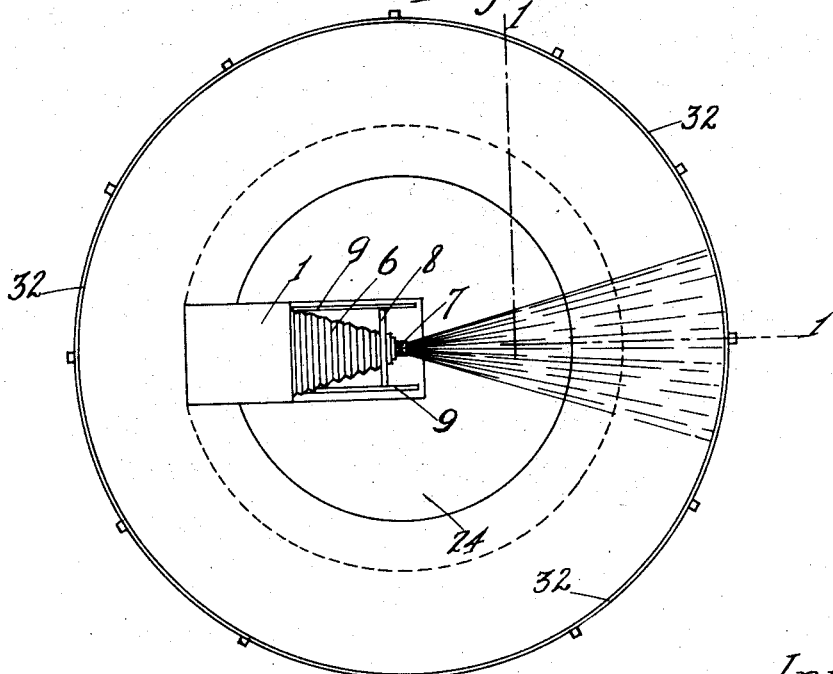
Figure 3:
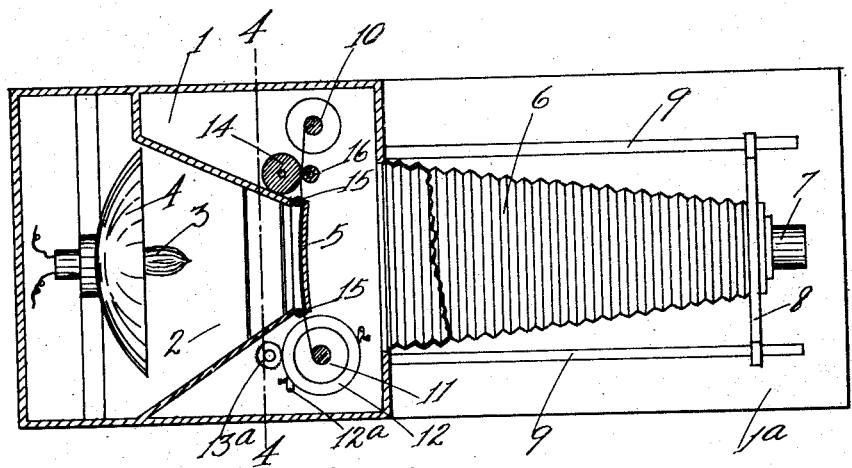
Figure 4:
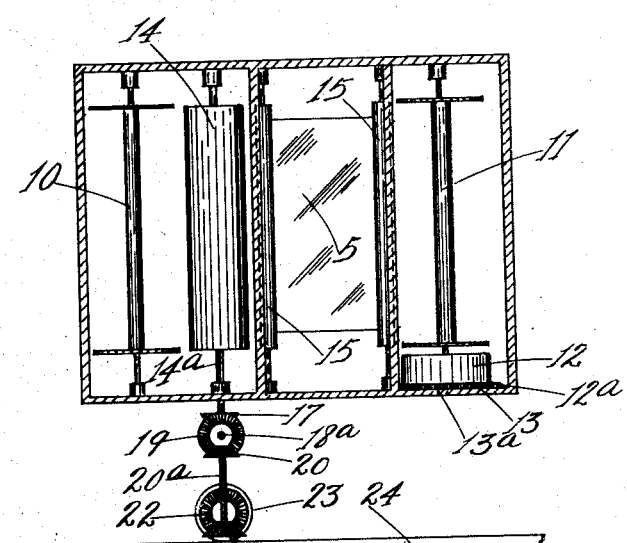

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of my apparatus showing the enlargement support fragmentarily and in section to facilitate the illustration, Fig. 2 is a top or plan view of my apparatus complete on a reduced scale, Fig. 3 is a sectional view on an enlarged scale through 3—3 of Fig. 1 and Fig. 4 is a sectional view through 4—4 of Fig. 3.

Similar characters of reference refer to similar parts and portions throughout the several views of the drawings.

The casing 1, light chamber 2, lamp 3, reflector 4, negative support 5, bellows 6, lens 7, bellows support 8, guides 9, negative roll spool 10, negative roll spool 11, spring 12, gear 13, pinion 13ª, draft roll 14, idlers 15, idler roll 16, gears 17, 18, 19, 20, 21, and 22, roller 23, supporting table 24, projecting apparatus axis 25, gear 26, pinion 27, sheeve 28, sheeve 29, motor 30, belt 31, and enlargement support 32 constitute the principal parts and portions of my apparatus.

The light projecting apparatus consists of a casing 1 which is provided with a light chamber 2 therein in which is mounted a lamp 3 back of which is a reflector 4. Mounted in front of the lamp 3 is a negative support 5 and mounted between this support 5 and the lamp may be provided translucent plates for diffusing the light if desired. This casing 1 is provided on its front end with an extensible bellows 6, which is provided at its fixed end with a lens 7 which fixed end of the bellows with the lens is fixedly secured to a transverse support 8 which transverse support 8 is fixedly secured to the platform 1ª. This platform 1ª is fixedly secured to the axle 25. Thus it will be seen that the lens 7 is fixedly secured relatively to the axle 25. To this platform 1ª are secured guides 9 which serve as guides for the casing 1 when said casing 1 is moved forwardly and backwardly contracting and extending the bellows 6 while the support 8 with the lens 7 remains stationary on the platform 1ª. It will be here noted that the objective is fixedly positioned so that a point approximately half way between the nodal points thereof is in alinement with the axle 25 regardless of whether there are one or more than one lenses and regardless of their compositions the material of the lenses determining the radii of the negative and film support for adjustment of the radii in accordance with the lens composition. This platform 1ª is rigidly secured to the axle 25 so that when the axle 25 revolves the base 1ª together with the light projecting apparatus revolves with said axle 25. Journaled on this axle 25 is a circular table 24 which serves as a support for the roller 23 and it is supported by the legs 24ª.

The axle 25 is revolved by means of a gear 26 which engages the pinion 27 on a shaft 27ª upon which is mounted the sheeve 28 and connecting the sheeve 28 with the sheeve 29 is a belt 31. Said sheeve 29 is secured on the shaft of the motor 30 so that the motor 30 revolves the shaft 25 thus turning the projecting apparatus on its axis. Mounted in the casing 1 are the negative spools 10 and 11 which are revolubly mounted in said casing. The spool 11 is provided at its lower end with a spring 12 tending to turn it in one direction and it is provided with ratchet pawls 12ª to hold said spring while winding and it is wound through the pinion 13ª which is mounted on a shaft which extends through the bottom of the casing 1 and adapted for a key in the conventional manner. Mounted adjacent the ends of the negative support 5 and on the greater radius side thereof is a pair of idlers 15 which engage the opposite side of the negative from the support 5 and hold it in position against the surface of said support. Mounted between the spool 10 and support 5 is a pair of rollers 14 and 16. The roller 16 is an idler for pressing the film against the roller 14 and the roller 14 is secured to a shaft 14ª which extends downwardly through the bottom of the casing and on the lower end of which is secured a bevel gear 17 which engages with the bevel gear 18, mounted on a shaft 18ª and on the opposite end of said shaft 18ª is another bevel gear 19 which meshes with the bevel gear 20 on the shaft 20ª and on the lower end of said shaft 20ª is another bevel gear 21 which meshes with a bevel gear 22 on a shaft 22ª and on the opposite end of this shaft 22ª is a roller 23 which engages the top surface of the table 24. This is for the purpose of revolving the roller 14 for automatically moving the negative with the revolution of the projecting apparatus. It will be noted that the casing 1 may be shifted and the bellows partly closed changing the distance between the casing and the lens in which case the roller 23 will be shifted toward the center and the speed of the roller 14 reduced relatively to the distance of the negative from the lens so that the same relative speed of the negative passing the support is maintained with the revolution of the projecting apparatus. Surrounding the projecting apparatus at a pre-determined radius from the axis 25 is a support 32 upon which is mounted the sensitized member for receiving the projected figure.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction, there is provided a means and method for enlarging or reducing continuous film negatives to a continuous enlarged or reduced form, that the film will be moved in front of the light for projection on an arc of a circle on a certain radius from the intersection of the rays of light from the lens in certain relative speed with the movement of the projecting apparatus and that the same may be readily adjusted to the proper focal distance, that an enlargement may be made of great length and continuous in panoramic form, or otherwise as desired that the sensitized member support may be fixed at any desired diameter and the projecting apparatus positioned therein so that its axis 25 is concentric with said sensitized member support, that the objective is fixedly positioned so that its cardinal point is in alignment with said axis 25, then the film support is moved toward or from the objective by contracting or expanding the bellows until the projecting apparatus is in proper focus dependent upon the focal length of the objective, the machine is then fixed and ready for operation for the particular lens or system of lenses for which it has been adjusted.

Having thus described my invention what I claim as new and desire to secure by Letters Patent is:

1. An apparatus of the class described, including a projecting apparatus revolubly mounted on an axis in perpendicular alinement with the objective, a circular sensitized member support concentric with said axis, an arc shaped film support mounted in said projecting apparatus intermediate the lamp and objective of said projecting apparatus and means for adjusting the position of said arc shaped film support relatively to said objective whereby the projecting apparatus may be properly focused dependent upon the focal length of the objective.

2. An apparatus of the class described, including a projecting apparatus revolubly mounted on an axis in perpendicular alinement with the objective, a circular sensitized member support concentric with said axis, an arc shaped film support mounted in said projecting apparatus intermediate the lamp and objective of said projecting apparatus, means for adjusting the position of said arc shaped film support relatively to said objective whereby the projecting apparatus may be properly focused dependent upon the focal length of the objective and means for revolving said projecting apparatus and simultaneously feeding the film on said arc shaped support at certain relative speeds to each other.

3. An apparatus of the class described, including a projecting apparatus, including an objective, bellows and a source of light, revolubly mounted on an axis in perpendicular alignment with the objective, a sensitized member support positioned in a circular arc concentric with the axis of rotation of said projecting apparatus, an arc shaped film support mounted in said projecting apparatus intermediate said objective and said source of light and a means for adjusting the position of said film support relatively to said objective whereby the projecting apparatus may be properly focused dependent upon the focal length of the objective.

4. An apparatus of the class described, including a revolubly mounted support, an objective mounted at one end of said support in perpendicular alignment with the axis of said revolving support, an arc shaped film support mounted in alignment with the optical axis of said objective, a source of light also mounted in alignment with said optical axis and positioned on the opposite side of said film support from said objective, an enclosure for said film support and said source of light, a bellows connecting said objective with said enclosure and a circular sensitized member support positioned concentric with the axis of said revolubly mounted support and a means for adjusting the position of said film support and said source of light relatively to said objective whereby the film support and the objective may be readily focused dependent upon the focal length of the objective.

In testimony whereof, I have hereunto set my hand at San Diego, California, this 29th day of January, 1919.

JEAN E. STROMBERG.